United States Patent [19]

Liu

[11] Patent Number: 4,520,372

[45] Date of Patent: May 28, 1985

[54] PLOTTER PAPER LOADING ASSIST APPARATUS

[75] Inventor: Dean-Yuan Liu, Canoga Park, Calif.

[73] Assignee: Sanders Associates, Inc., Nashua, N.H.

[21] Appl. No.: 538,875

[22] Filed: Oct. 4, 1983

[51] Int. Cl.³ .......................................... G01D 15/28
[52] U.S. Cl. ..................................... 346/136; 242/182
[58] Field of Search ............................. 242/182–185, 242/75.46, 76, 67, 67.1 R, 67.2, 67.3 R, 67.5; 226/118, 119; 346/136, 112–118

[56] References Cited

U.S. PATENT DOCUMENTS

| | | | |
|---|---|---|---|
| 3,217,995 | 11/1965 | Sweeney | 242/185 |
| 3,305,873 | 2/1967 | Mourier | 346/112 |
| 4,477,822 | 10/1984 | Luoma et al. | 346/136 |

*Primary Examiner*—E. A. Goldberg
*Assistant Examiner*—A. Evans
*Attorney, Agent, or Firm*—Louis Etlinger; Wm. F. Porter, Jr.

[57] ABSTRACT

Apparatus for assisting in the loading of strip roll paper in a graphics drum plotter having a vacuum column disposed between a strip paper supply roller and a drum wherein insufficient space is available between the drum and the beam/writing head above it for reaching through to grasp the paper on the supply roller for pulling it through. A hook-shaped wire guide is hingedly attached through a slot in the center of the back wall of the vacuum column. The guide wire is biased by a counter weight to a position within the vacuum column and is moved out of the vacuum column through the slot from the force of paper descending into the vacuum column. The hook is shaped to guide paper being rolled off the supply roller across the space between the front and back walls of the vacuum column and to direct it into a position between the drum and the beam/writing head where it can be grasped.

4 Claims, 7 Drawing Figures

PLOTTER PAPER LOADING ASSIST APPARATUS

BACKGROUND OF THE INVENTION

The present invention relates to graphic drum plotters and, more particularly, to a guide apparatus for guiding strip paper from a supply roller across a vacuum column and into the space between the drum and beam/writing head during loading of the paper.

A typical graphics drum plotter is shown in simplified form in side cross-section and generally indicated as 10 in FIG. 1. The plotter 10 includes a supply roller 12 having strip paper 14 thereon, a vacuum chamber 16 having a rear wall 18 and a front wall 20, a drum 22, a beam 24 having a writing head 26 carrying a pen 28 mounted thereon, and a cover 30 hinged at 32 for covering the top of the working portion of the plotter 10. During loading, the paper 14 must first be positioned as shown in FIG. 2 wherein it spans across the top of the vacuum chamber 16 and into the space between the drum 22 and the beam 24/writing head 26. As shown in FIG. 3, the paper 14 is then drawn down into the vacuum chamber 16 to form a loop 34 by vacuum created thereunder in the area generally indicated as 36. The problem involved is that of getting the paper 14 from the position of FIG. 1 to that of FIG. 2. There is not enough space for an operator to reach between the drum 22 and the bottom of the beam 24 at the area of the arrow of FIG. 1 so as to grasp the paper 14 adjacent the supply roller 12 and pull it through. The supply roller 12 can be rotated, but that only causes the paper 14 to descend down into the vacuum chamber 16. Wherefore, it is the object of the present invention to provide a guide apparatus for simply and easily guiding the paper 14 from its position of FIG. 1 adjacent the supply roller 12 to a position between the drum 22 and beam 24/writing head 26 as shown in FIG. 2 wherein it can be grasped during loading procedures.

SUMMARY

The foregoing objective has been met in a graphics drum plotter having a vacuum column with front and rear walls disposed vertically between a paper supply roller adjacent and parallel to the rear wall and a drum adjacent and parallel to the front wall having a beam and writing head above and parallel thereto as described above by the improvement of the present invention for guiding paper from the supply roller across the vacuum column and to a point between the drum and beam/writing head during loading comprising: retractable guide means hingedly attached to the rear wall of the vacuum column adjacent the top thereof for movement between a first position wherein the guide means spans a portion of the space between the front and back walls and a second position retracted from the first position to allow the paper to loop down into the vacuum column, the guide means being shaped for guiding paper rolling off the supply roller across the space between the front and rear walls of the vacuum column and for directing it into a position between the drum and the beam/writing head where it can be grasped; and, bias means for urging the guide means towards the first position with a force less than that exerted against it by paper being drawn into the vacuum column.

In the preferred embodiment, the guide means comprises an upward-facing hook of wire disposed within a vertical slot in the rear wall of the vacuum chamber. Additionally, in the preferred embodiment, a pair of vertical, parallel, spaced guide plates are disposed on opposite sides of the slot for guiding the wire hook between the two aforementioned positions.

DESCRIPTION OF THE PREFERRED EMBODIMENT

Figure 1:
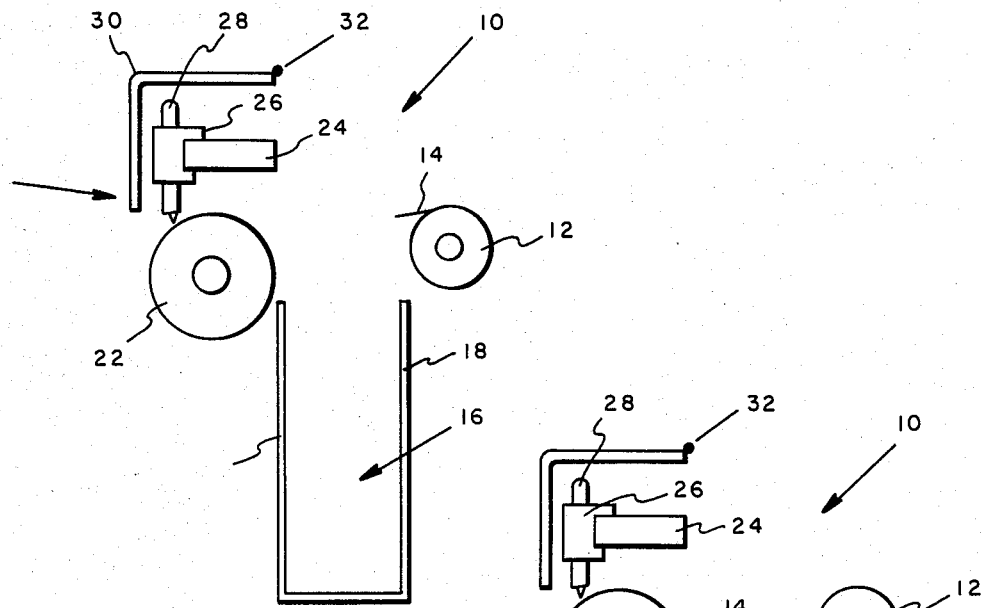
FIGS. 1, 2 and 3 are prior art graphic drum plotters
Figure 3:
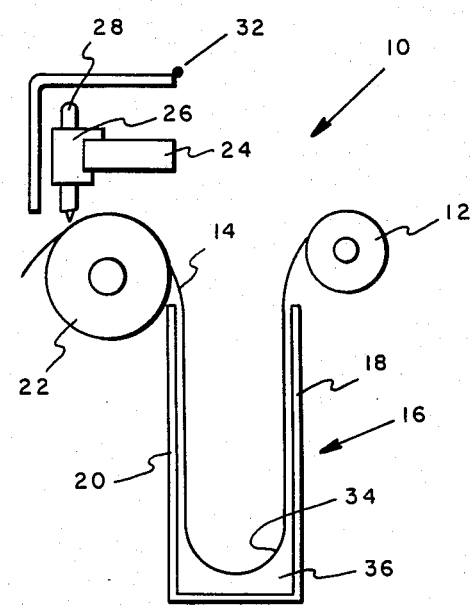
Figure 2:
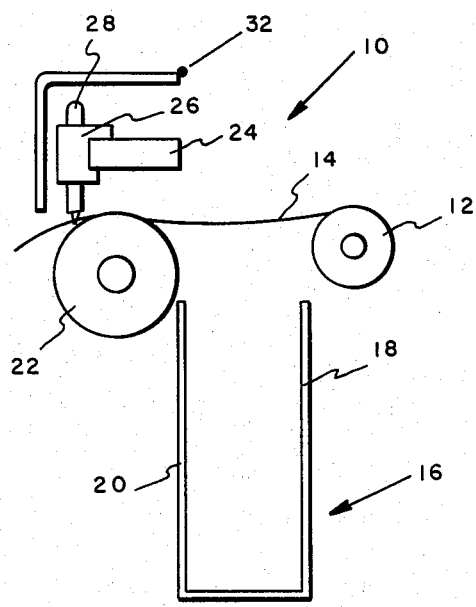
Figure 4:
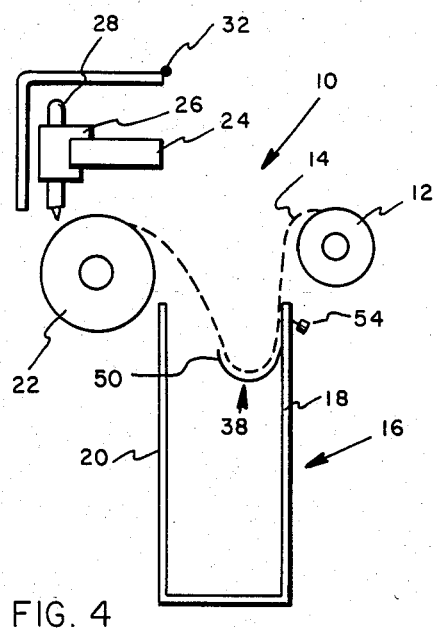
FIG. 4 is a graphic drum plotter showing a paper guide according to the present invention.

Turning first to FIG. 4, the present invention is shown in simplified form. As shown therein, the guide of the present invention, generally indicated as 38, is hingedly mounted on the rear wall 18 of the vacuum chamber 16 adjacent the top thereof and spans a substantial portion of the opening between the rear wall 18 and front wall 20. Additionally, the guide 38 is shaped such that as paper 14 is rolled off of the supply roller 12 and tends to descend into the vacuum chamber 16, it is redirected and guided across the vacuum chamber 16 and into the desired position between the drum 22 and the beam 24/writing head 26 as indicated by the dotted line.

Figure 5:
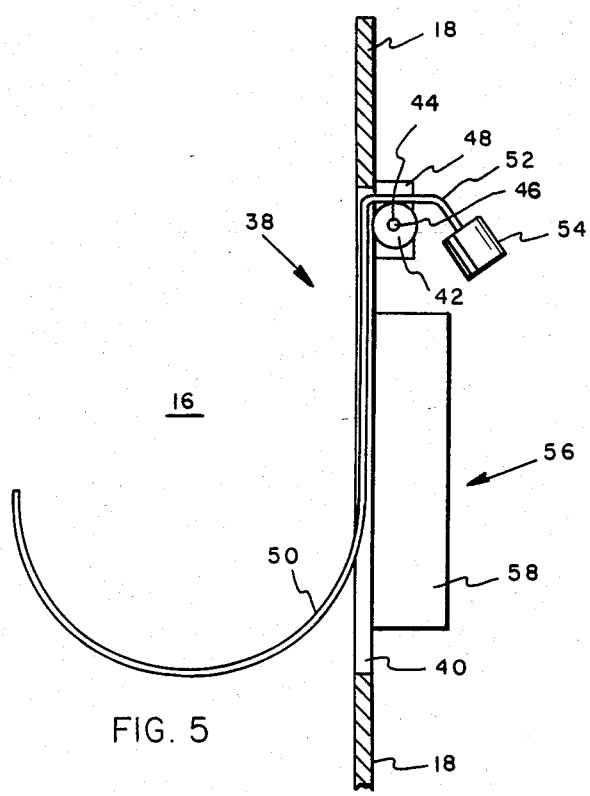
FIGS. 5, 6 and 7 are views showing paper guide of the present invention in side and front elevation in greater detail than FIG. 4.
Figure 6:
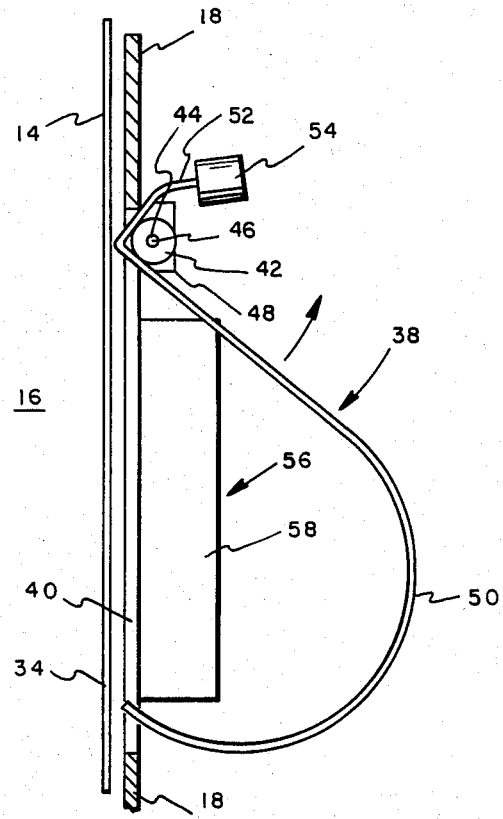
Figure 7:
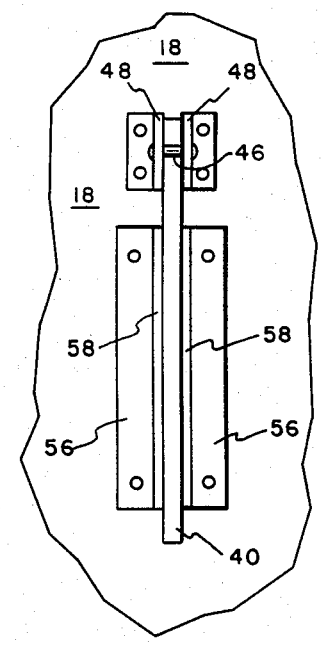

Turning now to FIGS. 5-7, the guide 38 of the present invention is shown in greater detail in its preferred embodiment. The embodiment described herein is as successfully incorporated within a commercial plotter manufactured and sold by the assignee of the present application. Guide 38 is of wire and mounted through a vertical, narrow slot 40 disposed in the center of the rear wall 18. Guide 38 comprises a pivot plate 42 having a hole 44 therethrough through which passes a pivot pin 46 connected between two parallel mounting tabs 48 fastened on either side of the slot 40. A wire, upward-facing hook member 50 extends from the pivot plate 42 through the slot 40 and into the vacuum chamber 16. A wire bar 52 extends in the opposite direction outward away from the vacuum chamber 16 on the back side of rear wall 18 from the pivot plate 42 and has a counter weight 54 attached thereto. The hook member 50 and wire bar 52 can be formed of a single piece of wire with the pivot plate 42 connected thereto such as by spot welding. The guide 38 is adapted to pivot around pivot pin 46 between a first position as shown in FIG. 5 (being the same position shown in FIG. 4) and a second position retracted through the slot 40 as shown in FIG. 6. The counter weight 54 is sized to gently urge the guide 38 into the position of FIG. 5; but, is sized such that when the loop 34 of paper 14 is drawn down into the vacuum chamber 16, the pressure thereof will urge the guide 38 back through the slot 40 to its retracted position of FIG. 6 against the biasing force of the counter weight 54.

By constructing the guide of wire, the slot 40 can be narrow, such as to be a minimum source of vacuum loss to the chamber 16. It is preferred that a pair of guide members 56 having parallel guide plates 58 be mounted on either side of the slot 40 as shown in FIG. 7 so as to assist in guiding the hook member 50 through the slot 40 in its movement between the two positions as described.

Wherefore, having thus described my invention, I claim:

1. In a graphics drum plotter having a vacuum column with front and rear walls disposed vertically between a paper supply roller adjacent and parallel to the rear wall and a drum adjacent and parallel to the front wall having a beam and writing head above and parallel thereto, the improvement for guiding strip paper from the supply roller across the vacuum column and to a point between the drum and beam/writing head during loading comprising:

(a) retractable guide means hingedly attached to the rear wall of the vacuum column adjacent the top thereof for movement between a first position wherein said guide means spans a portion of the space between the front and rear walls and a second position retracted from said first position to allow the paper to loop down into the vacuum column, said guide means being shaped for guiding paper rolling off the supply roller across the space between the front and rear walls of the vacuum column and for directing it into a position between the drum and the beam/writing head where it can be grasped; and, (b) bias means for urging said guide means towards said first position with a force less than that exerted against it by paper being drawn into the vacuum column.

2. The improvement of claim 1 wherein:
said guide means comprises an upwards-facing hook disposed within a vertical slot in the rear wall of the vacuum chamber.

3. The improvement of claim 2 and additionally comprising:
a pair of vertical, parallel, spaced guide plates disposed on opposite sides of said slot for guiding said wire hook between said positions.

4. The improvement of claim 2 wherein:
said hook is of a wire material.

* * * * *